UNITED STATES PATENT OFFICE.

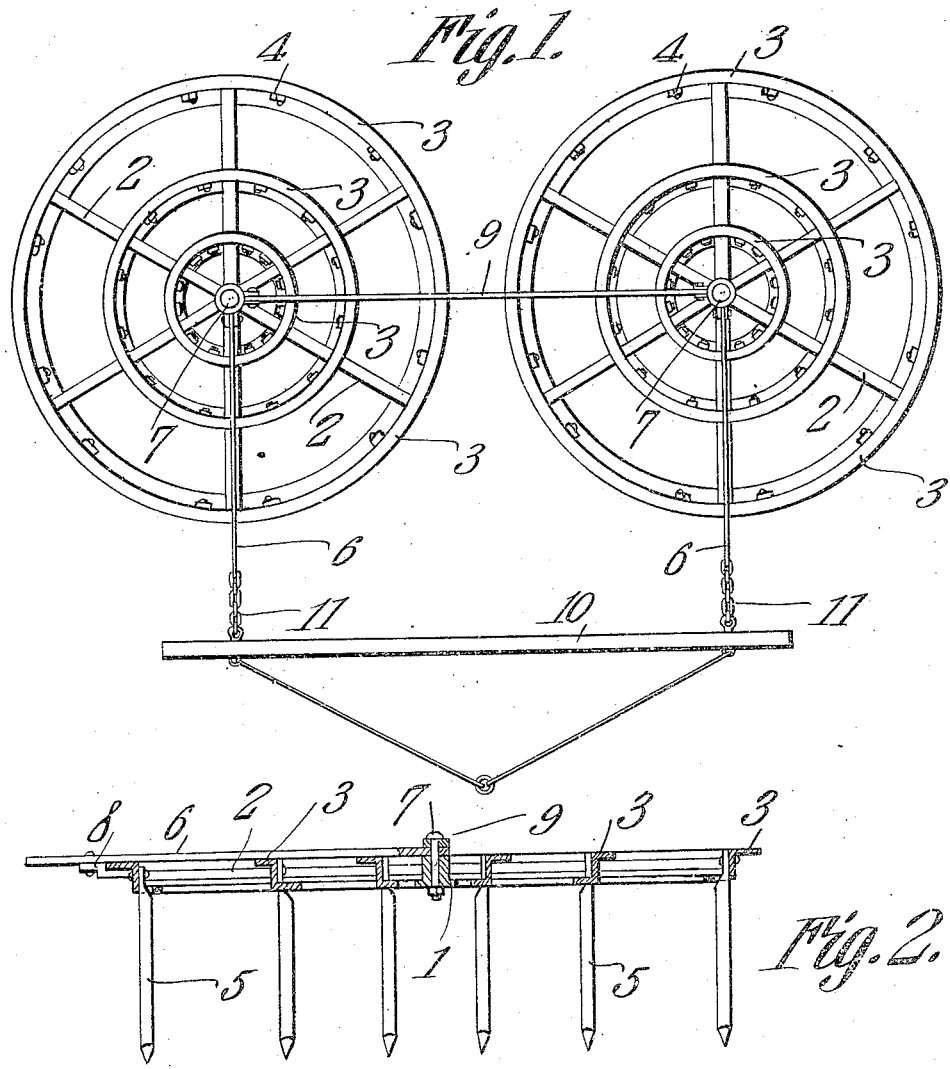

GEORGE A. OLSON, OF RAMEY, MINNESOTA.

HARROW.

942,511.

Specification of Letters Patent.  Patented Dec. 7, 1909.

Application filed May 26, 1909.  Serial No. 498,418.

To all whom it may concern:

Be it known that I, GEORGE A. OLSON, a citizen of the United States, residing at Ramey, in the county of Morrison and State of Minnesota, have invented a new and useful Harrow, of which the following is a specification.

This invention has relation to harrows and it consists in the novel construction and arrangement of its parts, as hereinafter shown and described.

The object of the invention is to provide a harrow having a series of horizontal rotating members carrying pivoted teeth, which are so positioned and arranged upon the said members as to cause the members to rotate as the implement is drawn along the surface of the ground.

A further object of the invention is to provide connecting and draft gear for the said members which is so applied as to hold the said members in proper position with relation to each other and to prevent the same from having a tendency to tilt in a forward direction as the implement is moved over the ground.

In the accompanying drawings:—Figure 1 is a top plan view of the harrow. Fig. 2 is a vertical sectional view of one of the members thereof. Fig. 3 is a side elevation of one of the teeth, showing the manner in which the same is pivoted.

As hereinbefore indicated the harrow is composed of a series or gangs of rotating members, and a description of one of the said members will answer for all. Each member consists of a central hub 1, to which are attached the radially disposed spokes or arms 2. A series of rings 3 is concentrically arranged with relation to the hub 1, and said rings are formed from Z-bars. The spokes 2 pass transversely through the vertical portions of the bars of which the rings 3 are composed and terminate at the outer ring of the series. The inner horizontal flange of each Z-bar of which the said rings are composed is provided with a series of elongated slots 4, and harrow teeth 5 pass vertically through the said slots and are pivoted at their upper ends to the vertical webs of the said bars. Each harrow member is provided with a draft gear which consists of a beam 6, pivoted at its rear end upon a bolt 7, which passes through the hub 1, and upon which the said hub is journaled. Each beam 6 is provided upon its underside with a clip which is adapted to pass under the upper flange of the Z-bar of the outer ring 3. A connecting gear for the several rotating harrow members consists of a bar 9, which is connected at its ends with the pins or bolts 7 of the adjacent harrow members. The connection between the hubs 1 and the draft beams 6 and connecting bars 9 with the pins 7 is preferably of a pivotal nature which will permit of a certain amount of flexibility between the adjacent rotary members of which the harrow is composed. A draft bar 10 is located in advance of the forward ends of the beams 6, and is connected with the said beams by means of chains 11. Draft animals may be attached to the draft bars 10 in any suitable manner.

From the above description it is obvious that the teeth 5 at one side of the harrow members will be approximately in vertical positions as the implement is drawn along the surface of the ground, and the rear edges of the said teeth will be in contact with the rear ends of the slots 4 provided in the rings 3, as indicated in heavy lines in Fig. 3. At the opposite side of the harrow the teeth will be in inclined positions, as indicated by the dotted lines in Fig. 3. Thus, at one side of the harrow member there is greater frictional contact between the teeth and soil than at the opposite side, and, consequently the said harrow members will rotate upon the axes of the bolts 7. This rotary movement on the part of the harrow members will have a tendency to keep the teeth 5 free from the accumulation of roots, stalks, etc., and, at the same time, the said teeth 5 will swing about an axis, and consequently their lower ends are presented to the soil at all sides, and consequently the movement of the said teeth will have a tendency to keep the same sharp at their lower ends. Furthermore, the flexible connection between the adjacent harrow members as explained is such as to permit said members to accommodate themselves to the surface of the soil irrespective of irregularities therein. By reason of the fact that the clips 8 project under the upper flanges of the outer rings of the rotating harrow members the said members are free to rotate, but the draft beams 6 are held parallel with the planes of the members, and consequently the members cannot have a tendency to tilt as they are drawn along the surface of the ground.

Inasmuch as the bars 3 are of Z configuration, the upper and lower flanges of the said bars will brace the entire structure and add rigidity to each individual rotating harrow member. At the same time the vertical webs of the said bars serve as supporting means for the pivoted harrow teeth.

Having described my invention, what I claim as new, and desire to secure, by Letters Patent, is:—

1. In a harrow a member mounted for rotation and consisting of a series of Z-bars, teeth pivoted thereto for limited swinging movement, a hub located within the bars, and spokes radiating from the hub and passing transversely through the vertical webs of the Z-bars.

2. A harrow comprising a Z-bar, teeth pivoted thereto, a hub, spokes connecting the hub with the Z-bar, a draft beam pivotally connected with the hub, and a clip attached to the draft beam and extending under the outer flange of the Z-bar.

3. A harrow comprising a plurality of rotating members made up of Z-bars and annularly formed, teeth pivoted to the bars, hubs located within the said annuli, spokes connecting the hubs with the annuli, draft beams pivotally connected with the hub, clips attached to the beams and projecting under the outer flanges of the annuli, and a connecting bar pivotally joined at its ends with the centers of the adjacent rotating members.

In testimony that I claim the foregoing as my own, I have hereto affixed my signature in the presence of two witnesses.

GEORGE A. OLSON.

Witnesses:
 FRANK WALTERS,
 SAM PALMER.